M. SPORLEDER.
WATCH.
APPLICATION FILED JAN. 24, 1913.
1,069,348.
Patented Aug. 5, 1913.
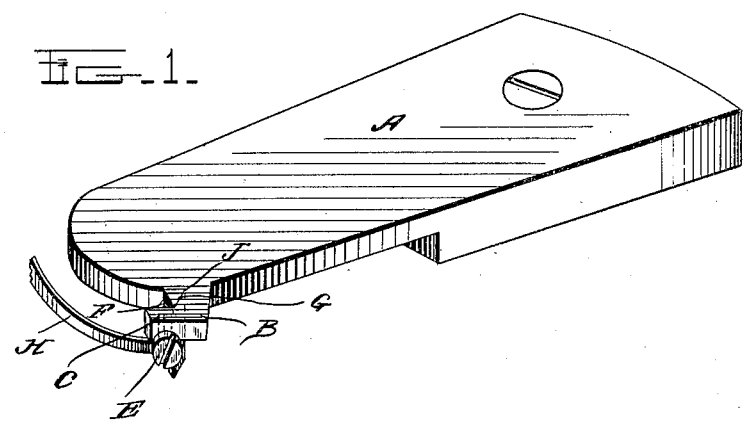
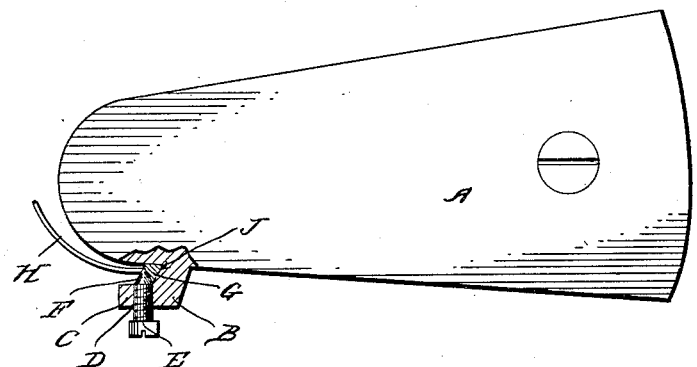
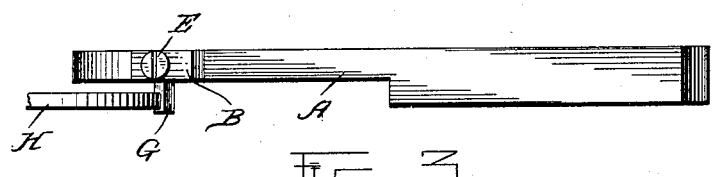
Michael Sporleder,
Inventor
Witnesses

UNITED STATES PATENT OFFICE.

MICHAEL SPORLEDER, OF COLORADO CITY, COLORADO.

WATCH.

1,069,348.  Specification of Letters Patent.  Patented Aug. 5, 1913.

Application filed January 24, 1913. Serial No. 743,990.

*To all whom it may concern:*

Be it known that I, MICHAEL SPORLEDER, a citizen of the United States, residing at Colorado City, in the county of El Paso and State of Colorado, have invented certain new and useful Improvements in Watches, of which the following is a specification.

My invention relates to improvements in watches or time pieces, and has special reference to improvements in the means or devices for connecting the hair springs with the balance cock or bridge.

The aim of the invention is the provision of means for connecting the stud of the hair spring with the balance cock or bridge, such means being of the simplest and cheapest possible construction and permitting instant application or detachment of the spring from the balance cock or bridge, as may be found necessary.

Another object of my invention is the provision of devices for connecting the stud of the hair spring with the balance cock or bridge, which means will under all conditions retain the spring in proper adjustment, and which in general will appeal to persons skilled in the art as presenting a thoroughly efficient and practical improvement of this character from every point of view.

With the attainment of these objects in view, my invention consists in means of the character and for the purpose stated embodying novel features of construction and combination of parts, substantially as disclosed herein.

In order that the detailed construction of my invention and its application and operation may be fully understood as well as its numerous advantages be thoroughly appreciated, I have illustrated in the accompanying drawings an embodiment of my invention and for a fuller understanding of my improvements I invite attention to such drawings.

Figure 1 is a perspective view of a balance cock or bridge provided with my improvements. Fig. 2 is a top plan view of the bridge, partly broken away to show the location and construction of my invention, and Fig. 3 is an edge view of the bridge having my stud securing means.

In the drawings: The letter A, designates the balance cock or bridge formed upon one side with the lug B, having an arm C, provided with a threaded opening D, to receive the stud securing screw E. This screw is formed at its lower end with a tapered portion F, which acts after the manner of a wedge against the angular or wedge shaped stud G, carrying the spring H, and retains the wedge shaped stud G in the seat J, formed by the walls of the lug and bridge.

It will be observed that the securing screw is readily accessible and can be operated to instantly release the stud and permit removal of the spring, or the screw can be adjusted instantly to secure the stud with spring in place.

An important feature of my invention is the extreme simplicity and inexpensiveness of my devce; its durability and ease of operation; and its absolute efficiency for the intended purpose.

I claim:

1. In combination with the bridge formed with a laterally depressed hook shaped lug, a stud carried by the spring and fitting in said lug, and an adjustable member for engaging and retaining the stud in position.

2. In combination with the bridge having the hook-shaped lug formed in line with and extending laterally from said bridge, said lug provided with an angular seat, an angular stud fitting said seat and an adjustable member engaging the stud, to secure the stud and allow its removal.

3. In combination with the bridge having the hook-shaped lug formed in line with and extending laterally from said bridge, said lug provided with a seat, a stud fitting said seat, and an adjustable member having a wedging engagement with the stud to retain the stud and allow its removal.

4. In combination with a bridge provided with a laterally disposed lug upon one edge having an angular stud seat, an angular stud fitting said seat and connected to the spring and a screw having a tapered end to bind against one face of the angular stud.

5. In combination with the bridge having upon one edge a hook-shaped lug forming with the bridge and a wall of the lug an angular seat, a hair spring having an angular shaped lug one wall of which fits in said angular seat, a screw mounted in the hook-shaped lug and having one end bearing against the outer wall of said angular lug to secure said lug in position.

In testimony whereof I affix my signature in presence of two witnesses.

MICHAEL SPORLEDER.

Witnesses:
FRANK PRIESS,
FRANK DREW.

Copies of this patent may be obtained for five cents each, by addressing the "Commissioner of Patents, Washington, D. C."